(No Model.) 2 Sheets—Sheet 1.

A. J. JOHNSON.
SEED PLANTER.

No. 468,178. Patented Feb. 2, 1892.

Witnesses
Geo. E. Frechs
J. M. Nesbit

Inventor
A. J. Johnson
per
Lehmann & Pattison
attys.

(No Model.) 2 Sheets—Sheet 2.
A. J. JOHNSON.
SEED PLANTER.
No. 468,178. Patented Feb. 2, 1892.
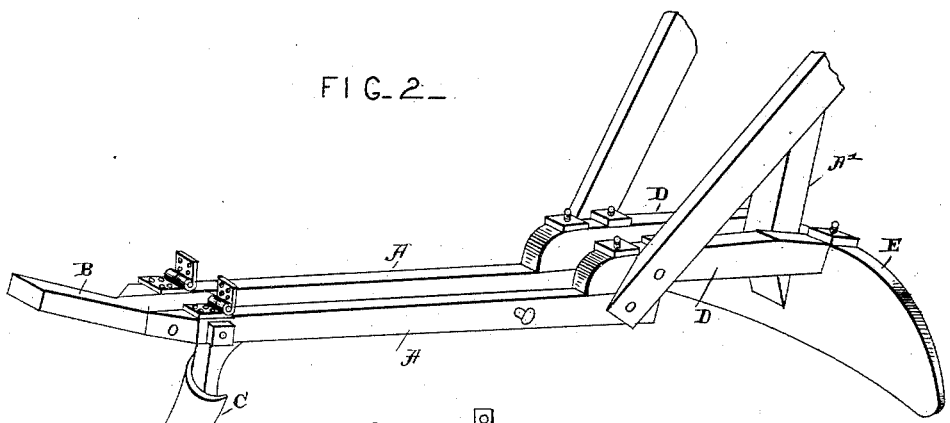
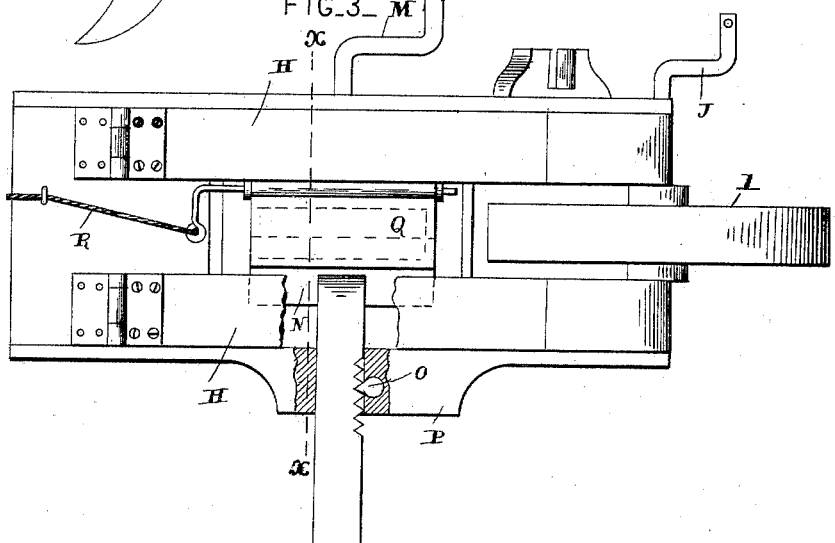
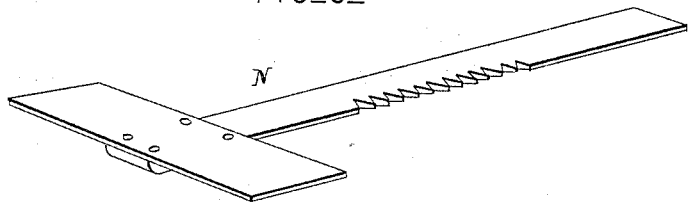
WITNESSES
Geo. E. Fitch
Roland A. Fitzgerald
INVENTOR
Andrew J. Johnson
per Lehmann & Pattison
attys.

UNITED STATES PATENT OFFICE.

ANDREW JACKSON JOHNSON, OF ETHEL, MISSISSIPPI.

SEED-PLANTER.

SPECIFICATION forming part of Letters Patent No. 468,178, dated February 2, 1892.

Application filed June 15, 1891. Serial No. 396,329. (No model.)

*To all whom it may concern:*

Be it known that I, ANDREW JACKSON JOHNSON, of Ethel, in the county of Attala and State of Mississippi, have invented certain new and useful Improvements in Seed-Planters; and I do hereby declare the following to be a full, clear, and exact description of the invention, such as will enable others skilled in the art to which it pertains to make and use it, reference being had to the accompanying drawings, which form part of this specification.

My invention relates to an improvement in seed-planters; and it consists in the combination and arrangement of parts, which will be fully described hereinafter, and pointed out in the claims.

The object of my invention is to construct a planter which is very effective in operation and cheap and simple in construction.

Figure 1:
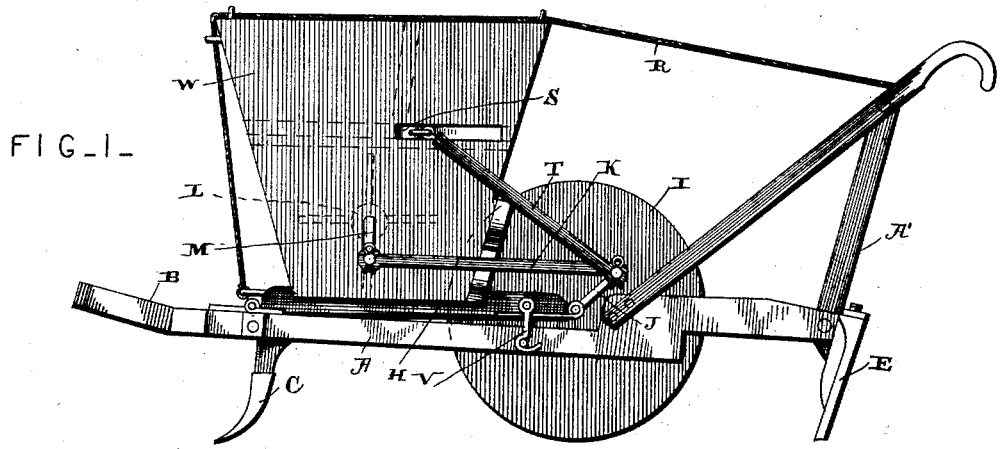
Figure 2:
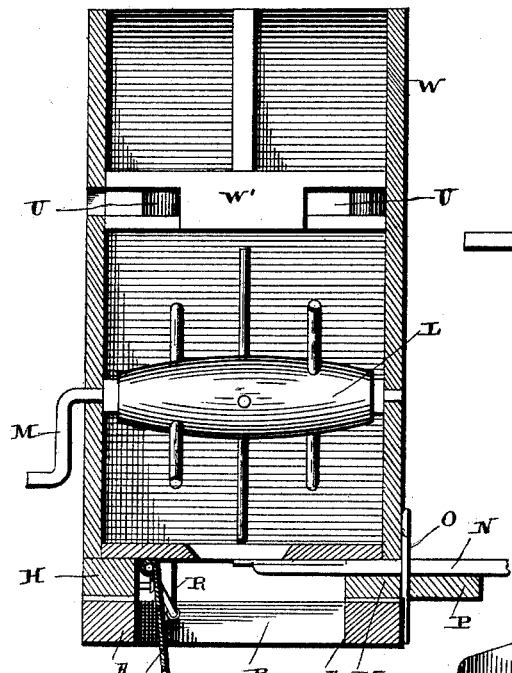
Figure 4:
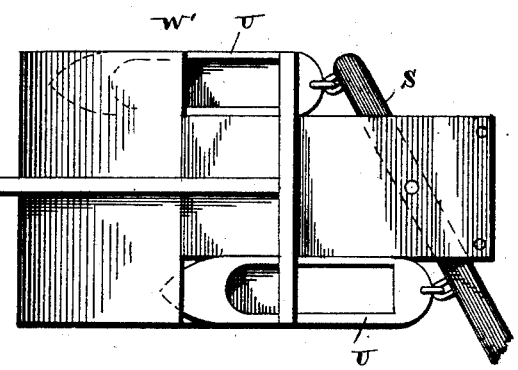
Figure 6:
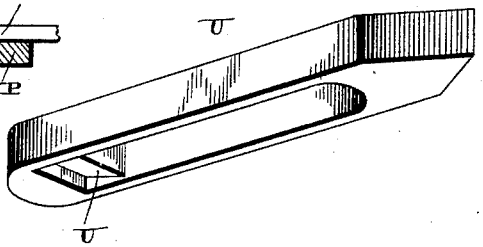

Figure 1 is a side elevation of my planter complete. Fig. 2 is a perspective view of the frame, the hinged portion of the planter being removed. Fig. 3 is a bottom view of the hopper. Fig. 4 is a plan of the removable seed-box, showing the seed-slide in position. Fig. 5 is a detached view of the seed-regulating slide. Fig. 6 is a bottom view of one of the seed-slides. Fig. 7 is a sectional view on the line *x x* of Fig. 3.

The main supporting-frame is composed of two side pieces A and a beam B, which extends outward from the forward end of the machine and is preferably turned upward, as herein shown. Secured to the under side of the beam is the furrow-opener C, of the ordinary construction. Extending rearward from the sides A are the parallel pieces D, to the ends of which the furrow-closer E is secured. The top edge of the furrow-closer is provided with recesses, in which the pieces D are securely bolted. The handles are secured to the rear end of the main frame and are braced by the support A', which is bolted to the furrow-closer and also to the pieces D.

Hinged to the forward end of the frame A is the hopper W, and to the rear end of the hopper-frame H is journaled the driving-wheel I, which extends down between the sides of the main frame.

Extending from the crank-shaft J of the driving-wheel is the arm K, which operates an agitator within the hopper by means of the crank-shaft M. This agitator, in connection with the hopper, forms a complete cotton-planter or fertilizer-distributer.

Arranged beneath the opening in the bottom of the hopper is the regulating-slide N, which has an arm extending outward, which is provided with notches with which the sharpened edge of the pin O engages as the latter is forced downward in the extension P on the side of the hopper-frame H. This slide serves to regulate the amount of seed or fertilizer dropped.

Hinged to one side of the discharge-opening of the hopper is the cut-off Q, which is operated by a cord R, which extends up over the hopper to the rear of the machine in reach of the operator. By means of this cut-off the flow of seed or fertilizer may be entirely stopped. This will be found especially useful in turning corners in the field and moving from one place to another.

For planting corn and peas or other small seeds I provide a removable hopper W', (shown in Fig. 4,) which fits within the large hopper. Pivoted to the forward end of this removable hopper W' is the lever S, one end of which extends through an opening in the side of the main hopper W, and is connected by means of an arm T to the crank-shaft J of the driving-wheel I, which gives to it a vibrating motion. Connected to the lever S, on each side of its pivotal point, are the two seed-slides U, which draw the seed from their respective boxes as the lever is made to vibrate and deposit it in the main hopper. The slides are preferably constructed, as shown in Fig. 6, with a depression U' on their under sides near their ends, which I have found by experiment keep the seed from clogging and stopping the slides.

When in operation, the hopper-frame is free to move up and down on its hinges, according to the surface of the ground; but when moving from one field to another the hinged frame is secured to the main frame by the hooks V, so that the driving-wheel forms a roller for the whole machine, thus forming an easy means of transporting it and at the same time saving the furrow opener and closer or coverer from the wear they would otherwise have in sliding over the hard road.

Having thus described my invention, I claim—

1. In a planter, a hopper, a supporting-frame therefor, extension P on one side of said frame having a vertical opening, a slide, a notched arm extending outward from said slide, and a pin adapted to fit the vertical opening in the extension P, said pin being constructed with a sharpened edge, so as to engage the notches in the arm of the slide, the parts being combined to operate substantially as shown and described.

2. In a planter of the character described, the combination, with the main frame provided with rearwardly-extending arms, of a scraper having a curved under edge and notches in its upper edge, into which the said extended arms fit, and a handle-support connected at its lower end to the scraper and the arms, substantially as shown and described.

3. In a planter, a main frame provided with a tooth C and scraper E, a hopper, a frame hinged at its forward end to the main frame and which supports the hopper, a wheel mounted on a crank-shaft journaled in the rear end of the hinged frame, seed-slides and a stirrer operated by said crank-shaft, a laterally-moving slide in the bottom of the hopper, a means for holding the said slide in the desired adjustment, a cut-off hinged to one side of the hopper-opening, and a cord for operating the said cut-off, the parts being combined to operate substantially as shown and described.

In testimony whereof I affix my signature in presence of two witnesses.

ANDREW JACKSON JOHNSON.

Witnesses:
J. H. WALLACE,
THOMAS LAND.